L. Chapman,
Handle for Umbrellas & Canes.

No. 90498. Patented May 25, 1869.

L Chapman

Witness
Chas H Smith
Geo. L. Pinckney

LEVI CHAPMAN, OF NEW YORK, N. Y.

*Letters Patent No. 90,498, dated May 25, 1869.*

IMPROVEMENT IN HANDLES FOR UMBRELLAS AND CANES.

The Schedule referred to in these Letters Patent and making part of the same.

*To all whom it may concern:*

Be it known that I, LEVI CHAPMAN, of the city and State of New York, have invented and made a new and useful Improvement in Handles for Umbrellas, Parasols, Canes, &c.; and I do hereby declare the following to be a full, clear, and exact description of the said invention, reference being had to the annexed drawing, making part of this specification, wherein—

Similar letters denote the same parts.

Figure 1:
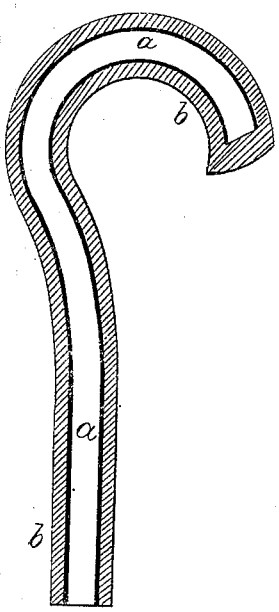
Figure 1 is a section of the said handle, longitudinally.
Figure 2:
Figure 2 is an end view of the same.

Parasol-handles have heretofore usually been carved out of ivory, bone, or wood, into various shapes, and more or less ornamental. These, when made of bone or ivory, are costly, in consequence of the time consumed in carving. This is also partially the case with wooden handles, and all such handles are liable to split by moisture and exposure.

My invention allows of the handle being made more or less ornamental, and of a variety of patterns or designs.

Said invention consists in a handle for umbrellas or similar articles, made of a plastic composition pressed upon a tubular metallic socket that receives the handle.

Said metallic socket and the plastic composition become firmly united, the metallic socket strengthens the handle; and the plastic composition is to be made of water-proof material, such as shellac and sawdust intimately ground together, and rendered plastic by heat, and moulded in a mould of the desired shape and ornamental character required for the handle.

Any other material, rendered plastic by heat, may be employed as the material to be pressed around the metallic pipe.

In the drawing, $a$ is the metallic tubular socket, and $b$, the composition pressed around the same, and forming the handle of a more or less ornamental character.

The end of the stick or cane is to be united with the handle by providing a screw-thread within the socket $a$, or in any other desired manner.

My handle is a new and useful article of manufacture.

What I claim, and desire to secure by Letters Patent, is—

The handle, formed of a plastic composition, pressed to shape around a tubular metallic socket, that receives the cane or stick, as and for the purposes set forth.

In witness whereof, I have hereunto set my signature, this 20th day of April, A. D. 1869.

L. CHAPMAN.

Witnesses:
CHAS. H. SMITH,
GEO. T. PINCKNEY.